United States Patent [19]
Yamaoka et al.

[11] Patent Number: 4,827,783
[45] Date of Patent: May 9, 1989

[54] KEY-SHIFT TRANSMISSION

[75] Inventors: Kojiro Yamaoka, Nishinomiya; Hideaki Okada, Takarazuka, both of Japan

[73] Assignee: Kanzaki Kokyukoki Mfg. Co., Ltd., Amagasaki, Japan

[21] Appl. No.: 98,072

[22] Filed: Sep. 18, 1987

[30] Foreign Application Priority Data

Oct. 9, 1986 [JP] Japan ................................ 61-240754

[51] Int. Cl.⁴ .................... F16H 3/08; G05G 5/10; G05G 9/00; G05G 13/00
[52] U.S. Cl. ...................................... 74/371; 74/477; 192/3.63
[58] Field of Search ............... 74/477, 473 R, 371, 74/372, 483 R; 192/3.63, 3.51

[56] References Cited
U.S. PATENT DOCUMENTS

| | | | |
|---|---|---|---|
| 2,847,871 | 8/1958 | Schick | 74/477 |
| 3,015,968 | 1/1962 | Szekely | 74/477 |
| 3,292,451 | 12/1966 | Jacklin et al. | 74/477 |
| 3,452,614 | 7/1969 | Conkle | 74/477 |
| 3,795,153 | 3/1974 | Seilly | 74/477 |
| 3,812,735 | 5/1974 | Von Kaler et al. | 74/371 |
| 4,103,566 | 8/1978 | Von Kaler et al. | 74/701 |
| 4,212,210 | 7/1980 | von Kaler et al. | 74/477 X |
| 4,305,309 | 12/1981 | Ookubo et al. | 74/477 |
| 4,422,536 | 12/1983 | Shatuck | 192/3.63 X |
| 4,508,190 | 4/1985 | Uchiyama | 192/3.63 X |
| 4,656,886 | 4/1987 | Edwards | 74/371 X |
| 4,673,055 | 9/1987 | Yamaoka et al. | 74/371 X |
| 4,719,814 | 1/1988 | Ida et al. | 74/477 |

FOREIGN PATENT DOCUMENTS 62-114247 7/1987 Japan .

Primary Examiner—Leslie A. Braun
Assistant Examiner—Harold F. Macris

[57] ABSTRACT

In a key-shift transmission which comprises a shifting mechanism including a shifter fork (51) slidable on a fork shaft (50), an interlocking mechanism for preventing a shifting operation at the engaged condition of clutch (22) is provided by utilizing a latching mechanism disposed between the fork and fork shaft. In addition to a spring-biased latching ball (55) cooperating with a plurality of annular grooves (52N-52R) of the fork shaft for the latching purpose, a second ball (61) is provided which is received in the fork and is operative to interlock such fork in cooperation with the annular grooves. The fork shaft is supported rotatably and is operatively connected to a clutch-disengaging pedal (26) so that the shaft is rotated at the clutch-disengaged condition to an angular position where additional cut-out grooves (65) formed to the fork shaft unlock the fork.

In an aspect of the invention, the fork shaft is formed with second cut-out grooves (74) by which a clutch-disengaging operation may be omitted for a quick shifting purpose under a relatively shock-free condition.

5 Claims, 6 Drawing Sheets

KEY-SHIFT TRANSMISSION

FIELD OF THE INVENTION

This invention relates to a key-shift transmission for use in speed-change purposes of small-sized working vehicles such as mower tractors.

More particularly, the present invention relates to a key-shift transmission including a shifting mechanism which protects shift keys, operative as clutch means for actuating a plurality of speed-change gears selectively one at a time, from a shock so as to prolong the life of such shift keys.

BACKGROUND OF THE INVENTION

As well known from, for example, U.S. Pat. Nos. 3,812,735 and 4,103,566, a key-shift transmission comprises a plurality of speed-change gears rotatably mounted on a transmission shaft, shift keys disposed within elongated axial grooves in the outer surface of the transmission shaft, and a shifter sleeve slidably mounted on the transmission shaft. The shift keys are connected co-slidably to the shifter sleeve which shifts the keys selectively to one of plural positions where the shift keys couple one of the change gears to the transmission shaft.

Control mechanism for shifting the shifter sleeve includes, in general, a latching means for latching the shifter sleeve on the transmission shaft at a neutral position and respective gear-coupling or operative positions. Such latching means prevents an unexpected start of the vehicle due to a spontaneous displacement of the shifter sleeve from the neutral position to an operative position, an unexpected stop of the vehicle due to a spontaneous displacement of the shifter sleeve from an operative position to the neutral position, and an unexpected sudden change in the vehicle speed due to a spontaneous displacement of the shifter sleeve between two operative positions. The latching means also provides, during a shifting operation by an operator, an adequate notice of arrival of the shifter sleeve to a position to be shifted because such latching means suddenly enlarges resisting force against the shifting operation when the shifter sleeve is shifted to an operative or neutral position.

For the purpose of protecting shift keys from damage which may result when the keys engage a rotating change gear having a relatively high speed of rotation, a clutch is usually provided which allows an operator to interrupt the input of power to the transmission so that he or she may performa shifting operation.

In practice, however, a key-shift transmission is often subjected to a shifting operation without disengaging such clutch. That is, shift keys are biased such that gear-engaging clutch portions thereof are projected radially outwardly from elongated axial grooves of a transmission shaft, and thus, even when relative rotation speed between a change gear and transmission shaft is relatively high, the clutch portions can enter clutch-receiving recesses in the inner circumference of the gear at the moment when the clutch-receiving recesses are aligned radially with the clutch portions of shift keys. Consequently, a shifting operation can be performed without disengaging the clutch. Operators are apt to neglect a clutch-disengaging operation at a shifting operation mainly because they dislike a reduction of the vehicle speed.

2

It is, however, true that, when a shifting operation is performed at a high relative rotational speed between a change gear and transmission shaft, shift keys are subjected to an impact or shock which will result in an earlier decrepitude of the keys.

Accordingly, a primary object of the present invention is to provide an improved key-shift transmission in which an interlocking mechanism for preventing such shifting operation is incorporated in a very simple structure.

BRIEF DESCRIPTION OF THE DRAWINGS

In the accompanying drawings.

SUMMARY OF THE INVENTION

Figure 1:
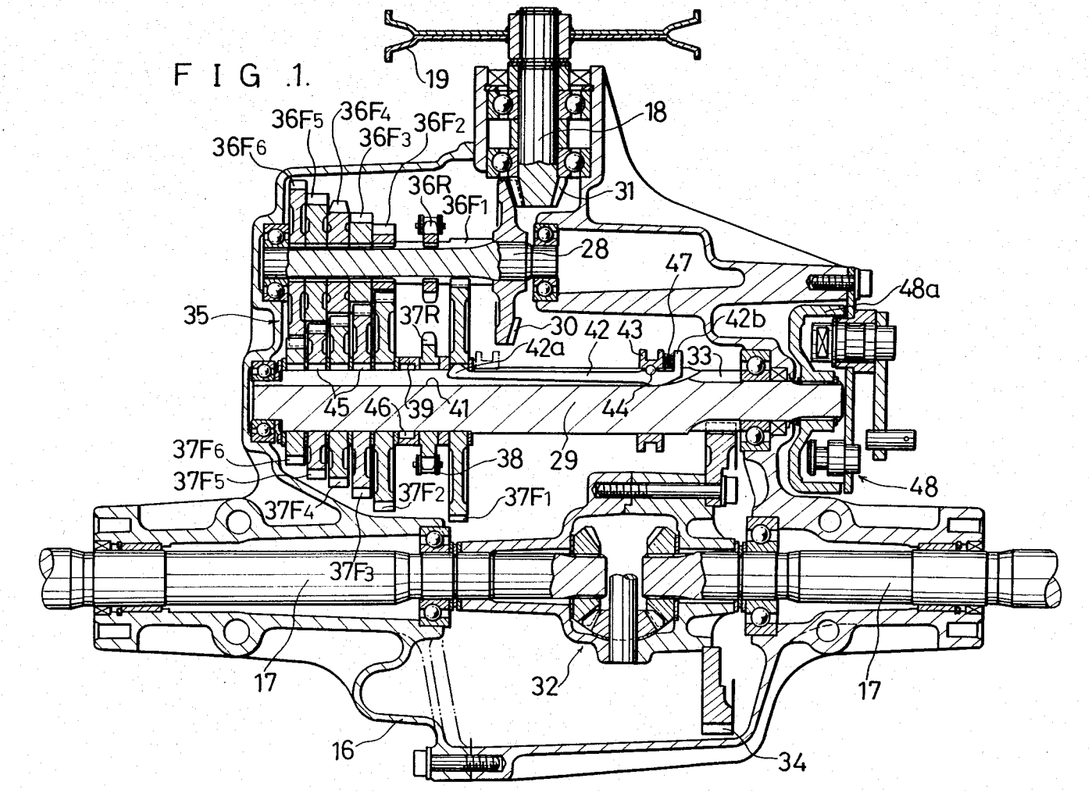
FIG. 1 is a sectional front view, partially developed, of a transmission mechanism in which a first embodiment of the present invention is employed.

As shown in FIG. 1, the key-shift transmission according to the present invention comprises:

a transmission shaft 29 having at its outer surface elongated axial grooves 41;

a plurality of axially spaced speed-change gears (one of the gears shown is a sprocket gear) 37F$_1$, 37F$_2$, 37F$_3$, 37F$_4$, 37F$_5$, 37F$_6$ and 37R which are rotatably mounted on the transmission shaft 29;

shift keys 42 which are slidably disposed within the axial grooves 41 for coupling the speed-change gears one at a time to the transmission shaft 29; and a shifter sleeve 43 which is slidably mounted on the transmission shaft 29.

The shift keys 42 are connected co-slidably to the shifter sleeve 43 which has a plurality of axially spaced operative positions where the shift keys 42 are located at respective gear-coupling positions thereof.

Figure 4:
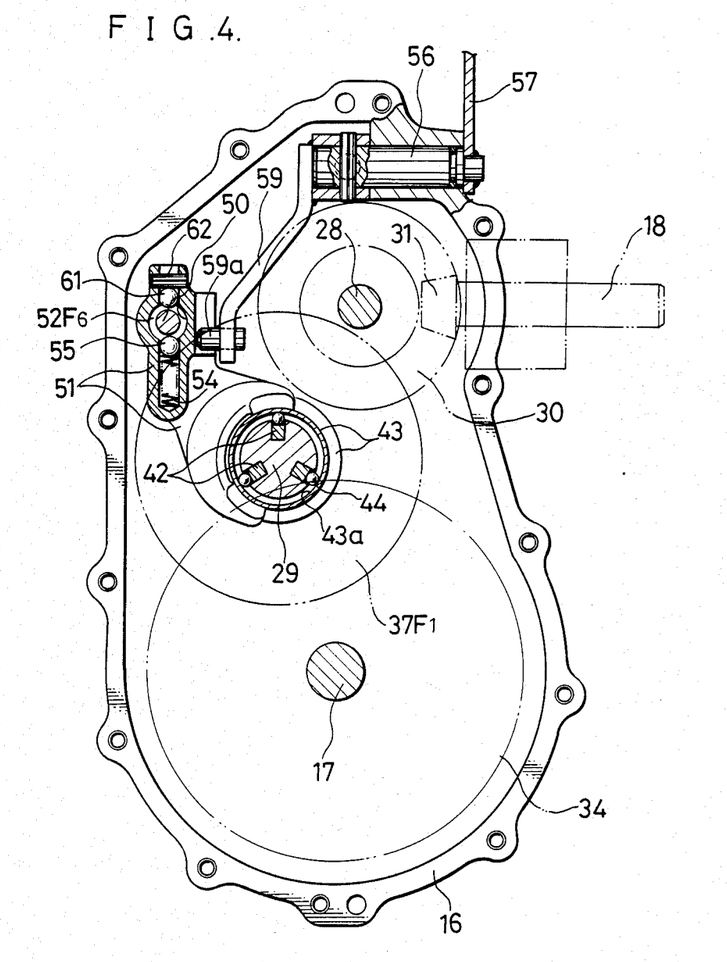
FIG. 4 is a vertical sectional view, partially omitted, of a transmission casing shown in FIG. 1.
Figure 5:
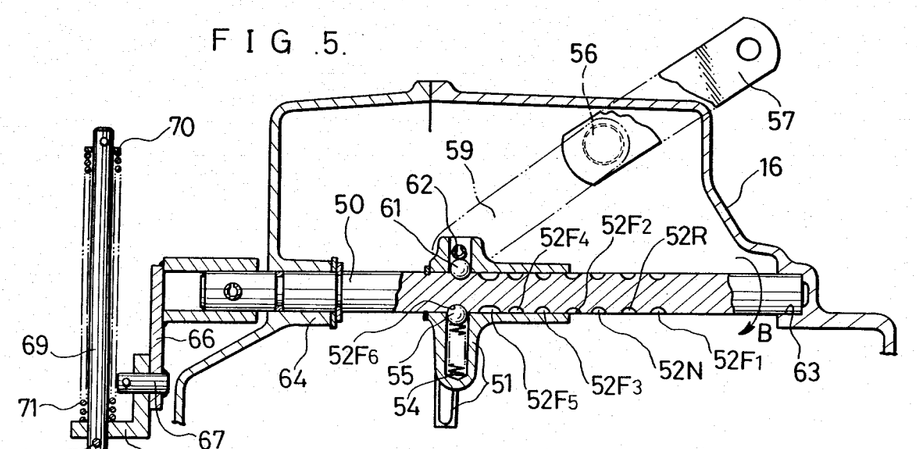
FIG. 5 is a sectional front view, partially developed, of a part of the transmission casing shown in FIG. 1.

As shown in FIGS. 4 and 5, a shifter fork 51 which is operated by a change lever 58 (FIG. 9) and is in engagement with the shifter sleeve 43 for causing a sliding movement of the sleeve is slidably mounted on a rotatable fork shaft 50 which extends parallel with the transmission shaft 29. The fork shaft 50 has at its outer surface a plurality of axially spaced annular grooves 52N, 52F$_1$, 52F$_2$, 52F$_3$, 52F$_4$, 52F$_5$, 52F$_6$ and 52R into which a spring-biased latching ball 55 received in the shifter fork 51 is projected so as to latch the shifter sleeve 43 on the transmission shaft 29, respectively, at each of a neutral position and the operative positions of the sleeve.

Slidable mounting of a shifter fork on a fork shaft as well as latching means comprising a plurality of annular grooves, formed to a fork shaft, and a spring-biased ball received in a shifter fork are well known to the art. A fork shaft constituting a guide for a slidable shifter fork according to the prior art is, however, fixedly provided. Contrary to this, the fork shaft 50 employed in the mechanism according to the present invention is rotatably provided.

Figures 6, 7:
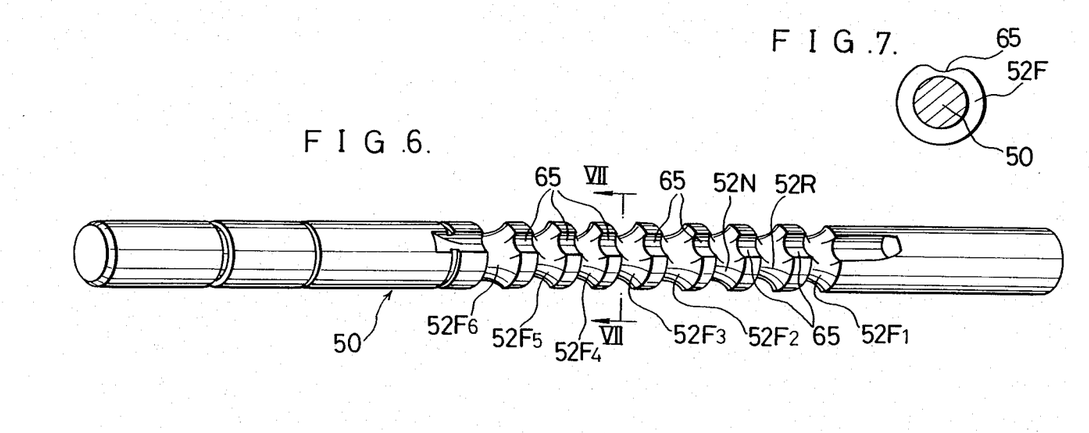
FIG. 6 is a perspective view of a fork shaft shown in FIGS. 4 and 5.
FIG. 7 is a cross-sectional view taken along line VII—VII of FIG. 6.
Figure 8:
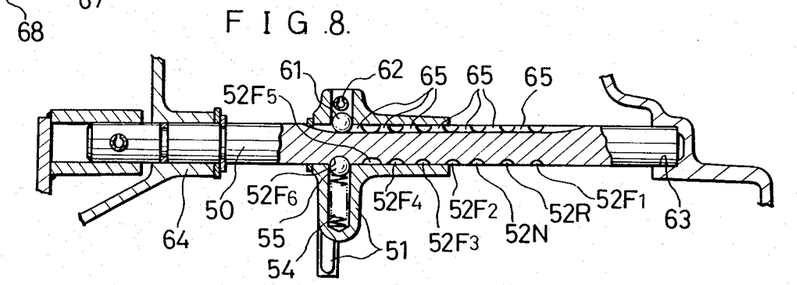
FIG. 8 is a sectional front view similar to FIG. 5, but showing another angular position of the fork shaft.

As shown in FIG. 5, a second ball 61 is received in the shifter fork 51 in a fashion such that a part of the second ball 61 enters one of the annular grooves 52N–52R and engages side walls of such annular grooves so as to prevent a sliding movement of the shifter fork 51 at each of the neutral and operative positions of the shifter sleeve. As shown in FIGS. 6 to 8, the fork shaft 50 is formed at its annular wall portions between the two adjacent annular grooves with a plurality of axially aligned cut-out grooves 65 which permit the second ball 61 to pass therethrough in the axial direction of the fork shaft 50 so as to permit a sliding movement of the shifter fork 51.

Further, the rotatable fork shaft 50 is operatively connected to a control means 26 for a clutch 22 (FIG. 9), operative to interrupt input of power to the transmission, such that when the clutch 22 is disengaged the fork shaft 50 is rotated to an angular position where the cut-out grooves 65 are aligned with the second ball 61 in the axial direction of the fork shaft 50.

The mechanism according to the present invention operates as follows:

FIG. 5 shows the fork shaft 50 in its angular position at a state where the clutch 22 (FIG. 9) is engaged, whereas FIG. 8 shows the fork shaft 50 in its angular position at a state where the clutch is disengaged.

As can be understood from FIG. 5, when the clutch 22 is in its engaged condition the second ball 61 enters at a part thereof any one of the annular grooves 52N, 52F$_1$–52F$_5$, 52R of fork shaft 50 and engages the side walls of such annular groove so as to restrain the shifter fork 51 from sliding on the fork shaft 50. It is thus seen that a shifting operation using the change lever 58 shown in FIG. 9 cannot be performed in this condition.

Figures 9, 14:
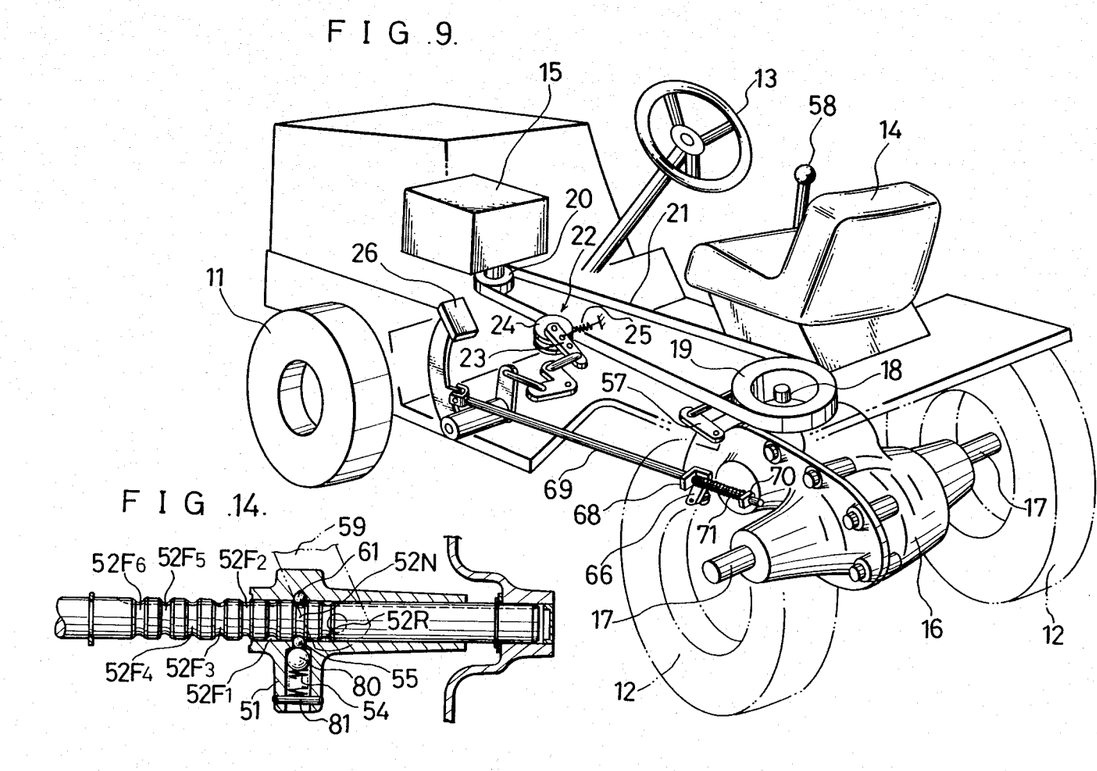
FIG. 9 is a schematic perspective view of a self-propelled working vehicle in which the first embodiment is employed.
FIG. 14 is a sectional front view, showing an alternative of latching means shown in FIGS. 5 and 10.

When the clutch 22 shown in FIG. 9 is disengaged and thus the fork shaft 50 is rotated to the angular position shown in FIG. 8, the cut-out grooves 65 in the outer surface of fork shaft 50 are aligned axially with the second ball 61 so that the shifter fork 51 can slide along the fork shaft 50 with the ball 61 passing through the cut-out grooves 65.

Consequently, a shifting operation using the change lever 58 is necessarily performed in a condition where the clutch 22 is disengaged. In such condition, input of power to the transmission is interrupted so that change gears 37F$_1$–37R and transmission shaft 29 shown in FIG. 1 is rotated only by inertia. It is thus seen that engagement of the shift keys 42 to a new change gear is necessarily achieved at a low relative rotation speed between such gear and transmission shaft 29 so that clutch portion or lug 42a of the key 42 is protected from being subjected to a shock.

In an aspect of the present invention, one or more second cut-out grooves 74 are formed to the fork shaft 50. As shown in FIGS. 10 to 13, such second cut-out grooves 74 are formed at annular wall portions between selected two annular grooves and are arranged such that these cut-out grooves 74 are aligned axially with the second ball 61 at the engaged condition of the clutch 22 so as to permit the second ball to pass therethrough in the axial direction of the fork shaft 50.

Figures 10, 11, 12, 13:
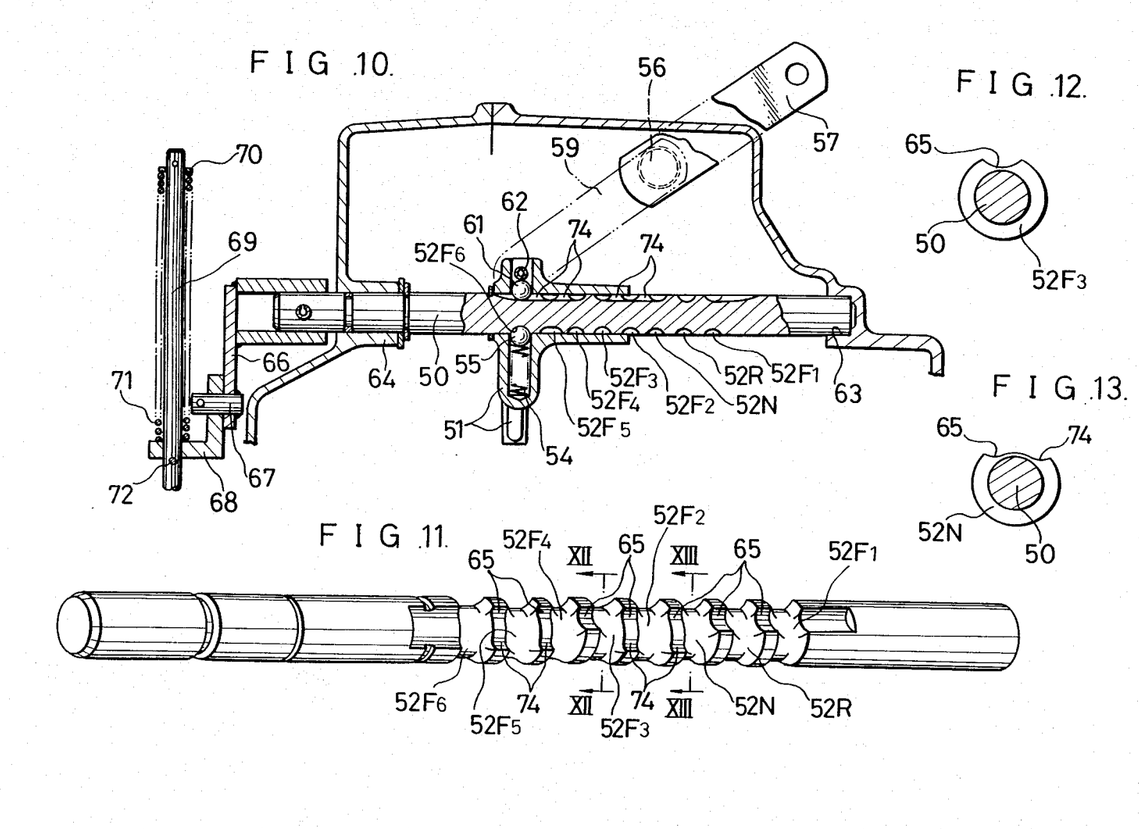
FIG. 10 is a sectional front view similar to FIG. 5, but showing a part of a second embodiment of the present invention.
FIG. 11 is a perspective view of a fork shaft shown in FIG. 10.
FIG. 12 is a cross-sectional view taken along line XII—XII of FIG. 11.
FIG. 13 is a cross-sectional view taken along line XIII—XIII of FIG.

FIG. 10 shows the angular position of fork shaft 50 at the engaged condition of clutch 22. In this condition, a shifting operation between particular two adjacent positions of the shifter fork 51 and shifter sleeve 43 can be performed without disengaging the clutch 22 due to the presence of the second cut-out grooves 74.

These cut-out grooves 74 are provided for enabling a quick shifting operation under a condition where the clutch lugs 42a of shift keys 42 are not subjected to a substantial shock. For example, such second cut-out grooves 74 may be provided so that they permit the performance of a shifting operation without disengaging the clutch within a lower forward direction speed range of the vehicle as well as within a higher forward direction speed range of the vehicle.

Such second or additional cut-out groove 74 is preferably formed for an easy manufacturing of fork shaft 50 in unison with one of the cut-out grooves 65, as shown in FIGS. 11 and 13.

Meanwhile, when a fork shaft having no second cut-out grooves 74 such as the fork shaft 50 shown in FIGS. 4 to 8 is employed, the shifer fork 51 is prevented from a sliding movement on the fork shaft by the second ball 61 at each of the neutral and operative positions of shifter sleeve 43, as can be understood from FIG. 5, so as to restrain the shifter sleeve from a spontaneous sliding movement. Nevertheless, the latching ball 55 and biasing spring 54 therefor are not omitted in the shifting mechanism according to the present invention because the spring-biased latching ball 55 provides, during a shifting operation performed at the angular position of fork shaft 50 shown in FIG. 8, an adequate notice of arrival of the shifter sleeve 43 to a new position to be shifted by a sudden enlargement of resisting force against the shifting operation due to a projection of such ball 55 into one of the annular grooves 52N–52R.

In the key-shift transmission according to the present invention, an interlocking mechanism for preventing a shifting operation at a clutch-engaged condition is provided by utilizing a latching mechanism disposed between a fork shaft and shifter fork in a fashion such that the interlocking is attained by an additional ball 61, received in the shifter fork 50, in cooperation with plural axially spaced annular grooves 52N–52R for the latching mechanism while permitting a required unlocking by a rotatable mounting of the fork shaft 50 and by cut-out grooves 65 additionally formed to the fork shaft. Such interlocking mechanism is very simple in structure and may be incorporated in the shifting mechanism with ease.

DESCRIPTION OF PREFERRED EMBODIMENTS

Vehicle Structure

FIGS. 1 to 9 illustrate a first embodiment which is employed in a small-sized working vehicle shown in FIG. 9.

The vehicle shown in FIG. 9 includes a pair of front wheels 11 and a pair of rear wheels 12. The vehicle is steered by turning the left and right front wheels 11 and is travelled by driving the left and right wheels 12 to rotate. A steering wheel 13 is arranged before an operator's seat 14, while an engine 15 is mounted on a front portion of the vehicle.

At a lower portion of the vehicle and between the left and right wheels 12 is mounted a transmission casing 16 from which left and right rear wheel axles extend. An input shaft 18 having thereon an input pulley 19 extends upwardly from the casing 16. For transmitting power from engine 15 into transmission casing 16, a belt 21 is entrained over a pulley 20 on the output shaft of engine 15 and pulley 19 referred to above.

Clutch 22 is provided for selectively interrupting input of power into the transmission casing 16. This clutch 22 comprises a belt-tightening pulley 24 supported by a rotatable arm 23 which is biased by a spring 25 to move towards a direction of pressing the pulley 24 against belt 21 so as to tighten the belt. For disengaging the clutch 22 by loosening the belt 21, a clutch pedal 26 is provided which is operatively connected to the arm 23 through a link mechanism shown so as to move the tightening pulley 24 apart from belt 21 when the pedal is trodden down.

Transmission Mechanism

Transmission mechanism within the casing 16 is shown in FIG. 1.

Within the casing 16 are rotatably arranged a drive shaft 28 and transmission shaft 29 which extend parallel with the rear wheel axles 17. To an end portion of the drive shaft 28 is press-fitted a large bevel gear 30 which is meshed with a small bevel gear 31, integrally formed to the inner or lower end of input shaft 18, so that the drive shaft 28 is driven to rotate at a reduced speed of rotation by the input shaft. Between the left and right rear wheel axles is disposed a differential gearing 32 to which the transmission shaft 29 is drivingly connected by meshing a small gear 33, integrally formed to shaft 29, with a large input gear 34 of the differential gearing.

Between the drive shaft 28 and transmission shaft 29 is arranged a key-shift transmission mechanism 35 which comprises forward direction change gears $36F_1$, $36F_2$, $36F_3$, $36F_4$, $36F_5$, and $36F_6$ and reverse direction sprocket gear 36R, fixedly mounted on the drive shaft 28, and forward direction change gears $37F_1$, $37F_2$, $37F_3$, $37F_4$, $37F_5$, and $37F_6$ and reverse direction sprocket gear 37R rotatably mounted on the transmission shaft 29. Corresponding two forward direction gears on the shafts 28 and 29 are meshed mutually so as to provide six forward direction change gear trains, whereas a chain 38 is entrained over the sprocket gears 36R and 37R so as to provide a reverse direction drivetrain. Of the forward direction change gear trains, five change gear trains providing the second to sixth speeds are disposed successively from the right to the left, as viewed in FIG. 1, so that change gears $37F_2$–$37F_6$ for lower to higher transmission ratios are disposed successively on the transmission shaft 29 in that order. Between the second speed gear $37F_2$ and reverse direction sprocket gear 37R on the transmission shaft 29 is disposed a neutral position collar 39. The first speed gear train which is used or actuated only in particular cases is disposed to the right side, as viewed in FIG. 1, of the reverse drive train.

Figure 2:
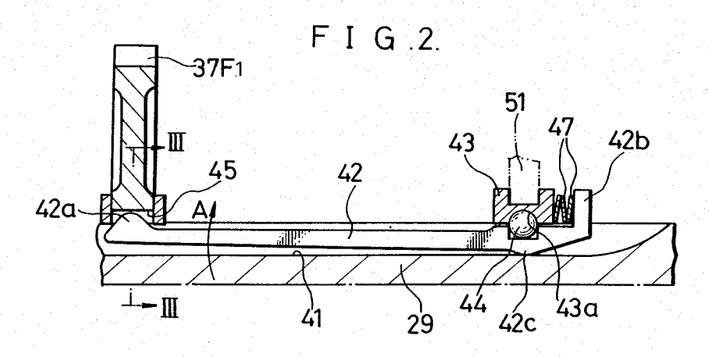
FIG. 2 is an enlarged sectional view of a part of FIG. 1.
Figure 3:
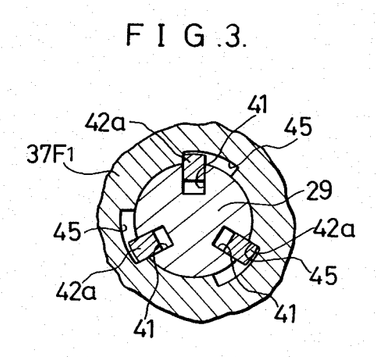
FIG. 3 is a cross-sectional view taken along line III—III of FIG. 2.

As shown in FIGS. 1 to 3, the transmission shaft 29 is formed at its outer surface with three elongated axial grooves 41 within which three shift keys 42 are slidably disposed. On the shaft 29 is slidably mounted a shifter sleeve 43 to which each shift key 42 is connected co-slidably using a ball 44 which is retained in a recess formed to a base end portion of the key and is received by an annular groove 43a in the inner circumference of shifter sleeve 43. Shift key 42 has at its free end portion a clutch lug 42a. As clearly shown in FIGS. 2 and 3 with respect to the change gear $37F_1$, each of the gears $37F_1$–37R on the transmission shaft 19 is formed at the inner circumference thereof with three recesses 45 into which the clutch lugs 42 of shift keys 42 may project from the axial grooves 41 in the transmission shaft 29. Each of the recesses 45 shown in formed to have a circular width larger than that of the clutch lug 42a for an easy entering of such clutch lug. The neutral position collar 39 is formed at its inner circumference with an annular groove 46.

Each shift key 42 has a base end projection 42b, extending radially outwardly of the shaft 29, and a protrusion 42c which is in a slidable engagement with the bottom surface of elongaged groove 41 for providing a pivot at a base end portion of the key 42. Plural leaf springs 47 are disposed between the shifter sleeve 43 and base end projection 42b so as to bias each shift key 42 to rotate along the direction of arrow A shown in FIG. 2, namely towards a direction of projecting the clutch lug 42a into the recess 45.

As shown in FIG. 1, the transmission shaft 29 has an end portion, extending outwardly of the casing 16, on which a brake drum 48a forming a part of a brake 48 is fixedly mounted.

Shifting Mechanism

Shifting operation is achieved by providing a sliding movement to the shifter sleeve 43 so as to displace same selectively to a neutral position, where clutch lugs 42a of the shift keys 42 rest in the annular groove 46 of the neutral position collar 39, and to one of operative positions where the clutch lugs 42a enter the recesses 45 of one of the gears $37F_1$–37R so as to couple same to the transmission shaft 29. For such shifting operation, a fork shaft 50 and a shifter fork 51 guided thereby are provided in a fashion such that the fork shaft extends parallel with the transmission shaft 29, as shown in FIG. 4. Forked end portion of the shifter fork 51 is received in an annular groove formed to the outer circumference of shifter sleeve 43 so as to engage the fork to the sleeve in the axial direction of transmission shaft 29.

As shown in FIGS. 5 and 6, the fork shaft 50 is formed with axially spaced eight annular grooves 52N, $52F_1$, $52F_2$, $52F_3$, $52F_4$, $52F_5$, $52F_6$ and 52R. As shown in FIGS. 4 and 5, the shifter fork 51 is formed with a bore, extending perpendicular to fork shaft 50, in which spring 54 and ball 55 are disposed. Ball 55 projects under the biasing of spring 54 into each of the annular grooves 52N–52R when the ball is faced to such annular groove. Arrangement of the annular grooves 52N–52R in the axial direction of fork shaft 50 corresponds to the arrangement of neutral collar 37 and gears $37F_1$–37R on the transmission shaft 29, whereby latching means is provided which latches the shifter fork 51 to the fork shaft so as to restrain the shifter sleeve 43 from a spontaneous sliding movement at each of the neutral and operative positions on the transmission shaft.

As shown in FIGS. 4 and 5, a control shaft 56 is provided which extends through a wall of the casing 16 and has thereon a co-rotatable arm 57 outside the casing. Arm 57 is operatively connected to a change lever 58 which is provided at a side of the operator's seat 14, as shown in FIG. 9. As shown in FIG. 4, the control shaft 56 carries at the inner end thereof a curved arm 59 which in turn carries at a free end portion thereof a pin 59a engaging the shifter fork 51. Shifter fork 51 is displaced along the fork shaft 50 by a rotation of the control shaft 56 which is caused by operating the change lever 58.

Interlocking Mechanism

As shown in FIGS. 4 and 5, a second ball 61 is received in the shifter fork 51 by disposing such ball in the bore in which the latching ball 55 is received. This second ball 61 is arranged at an open end side of the bore and is kept in position by a split pin 62 carried by the shifter fork. The arrangement of the second ball 61 in the fork shaft is such that a part of this ball 61 enters, at the opposite side of latching ball 55, one of the annular grooves 52N–52R and engages side walls of such annular groove so as to prevent a sliding movement of shifter fork 51.

As shown in FIG. 5, the fork shaft 50 is received at one end thereof by a receiving bore 63 in the inner surface of a side wall of transmission casing 16 and at the other end portion by a hollow cylindrical portion 64 formed to another side wall of the casing 16. Such fork shaft 50 is not fixed to the transmission casing but is supported rotatably by the casing 16. As shown in FIGS. 6 to 8, the fork shaft 50 is formed at its annular wall portions between each two adjacent annular grooves 52N–52R with axially aligned cut-out grooves 65 which permit the second ball 61 to pass therethrough in the axial direction of fork shaft 50. Consequently, when the fork shaft 50 is rotated to an angular position shown in FIG. 8 where the cut-out grooves 65 are aligned with the second ball 61 in the axial direction of fork shaft 50, a sliding movement can be given to the shifter fork 51.

As shown in FIG. 5, the fork shaft 50 extends outwardly through the cylindrical portion 64. To the outer end of such fork shaft is secured an arm 66 to which a L-shaped plate member 68 is pivotally connected through a pin 67. As shown in FIGS. 5 and 9, a slidable rod 69 is provided which extends along the lengthwise direction of the vehicle and through a leg of the plate member 68. This rod 69 is pivotally connected at the fore end thereof to arm portion of the clutch pedal 26. On a rear end portion of the rod 69 is mounted a seat plate 70 which is prevented from getting-out by a pin fixed to the rod. A compression coil spring 71 is disposed on the rod 69 and between the plate member 68 and seat plate 70. To the rod 69 is fixedly attached a pin 72 with which the plate member 68 is engaged under the biasing of coil spring 71. The L-shaped plate member 68 and slidable rod 69 are illustrated in FIG. 5 at positions turned by 90 degrees from their actual positions.

When the clutch pedal 26 is trodden down, the rod 69 is pulled forwardly so that pin 72 is displaced forwardly. Consequently, the plate memeber 68 is turned by the biasing force of coil spring 71 so as to keep engagement with the pin 72 so that the fork shaft 50 is rotated or angularly displaced through arm 66 towards a direction of arrow B shown in FIG. 5. With respect to such angular displacement of fork shaft 50, it is predetermined that, when the pedal 26 is trodden down to a position where the clutch 22 is disengaged, the fork shaft 50 is rotated by about 30 degrees and the cut-out grooves 65 of fork shaft 50 are aligned with the second ball 61 in the axial direction of fork shaft 50.

Operation

The key-shift transmission mechanism 35 shown in FIG. 1 provides six forward direction speeds and one reverse direction speed of vehicle by a selective coupling of gears $27F_1$–27R to the transmission shaft 29 using the shift keys 42 or the clutch lugs 42a thereof.

As a shifting operation using the change lever 58 shown in FIG. 9, such operation cannot be performed under the engaged condition of clutch 22 where the second ball 61 enters at a part thereof one of the annular grooves 52N–52R and engages side walls of such annular groove, as shown in FIG. 5, so as to prevent a sliding movement of shifter fork 51 along the fork shaft 50. Consequently, an operator has to tread down the clutch pedal 26 firstly so as to rotate the fork shaft 50 to the angular position shown in FIG. 8 where the cut-out grooves 65 permit the second ball 61 to pass therethrough so as to allow a sliding movement of shifter fork 51 by an operation of change lever 58.

It is thus seen that a shifting operation is necessarily performed under the disengaged condition of clutch 22 where the transmission shaft 29 and gears $37F_1$–37R are rotated only by inertia. In such condition, relative rotational speed between each of the gears $37F_1$–37R and the transmission shaft 29 is very small so that, when the clutch lugs 42a of shift keys 42 are displaced to an axial position of a new gear and project into the recesses 45 of such new gear, engagement between the clutch lug 42a and gear causes no substantial shock.

The latching means shown in FIG. 5 may be changed to such that is shown in FIG. 14. In the alternative embodiment shown in FIG. 14, a latching ball 55 having a smaller diameter than that of the latching ball 55 shown in FIG. 5 is employed for reducing force required for displacing the shifter fork 51. Ball 61 for interlocking the fork is small-sized correspondingly. Spring 54 for biasing the latching ball 55 is fashioned to act upon such ball 55 through a larger ball 80. Pin 81 is employed for receiving the base end of spring 54 which is disposed at the open end side of a bore in the shifter fork 51.

Second Embodiment

A second embodiment is shown in FIGS. 10 to 13 in which parts corresponding to those of the first embodiment are designated by like numerals.

For an easy and quick shifting operation, the second embodiment is fashioned such that a clutch-disengaging operation may be omitted under conditions where the clutch lugs 42a of shift keys 42 are not subjected to a substantial shock even by a shifting operation under the engaged condition of clutch 22.

In the second embodiment, the fork shaft 50 having a plurality of cut-out grooves 65 for permitting a shifting operation under the disengaged condition of clutch 22 is further formed with second cut-out grooves 74 which permit the second ball 61 to pass therethrough at the engaged condition of the clutch where the fork shaft 50 takes the angular position shown in FIG. 10.

Such second cut-out grooves 74 are formed in the fork shaft shown on the annular wall portions between annular grooves 52N and $52F_2$, between annular grooves 52F$_2$ and 52F$_3$, between annular grooves 52F$_4$ and 52F$_5$, and between annular grooves 52F$_5$ and 52F$_6$. The second ball 61 is located in any one of the annular grooves 52F$_2$ and 52F$_3$ at a lower forward direction speed range of the vehicle, whereas such ball 61 is located in any one of the annular grooves 52F$_4$, 52F$_5$ and 52F$_6$ at a higher forward direction speed range of the vehicle. The fork shaft 50 employed in the second embodiment permits the performance of a shifting operation under the clutch-engaged condition within such lower speed range and within such higher speed range. Shifting between the lower speed range and higher speed range is permitted only under the clutch-disengaged condition. A sudden start of the vehicle towards the reverse direction may provide a shock to the operator. The annular wall portion between the annular grooves 52N and 52R has thus no second cut-out groove so that a clutch-disengaging operation is necessarily required. Shifting between a forward directional speed and reverse directional speed will result in a substantial change in the vehicle speed. From this, a second cut-out groove is not formed on the annular wall portion between the annular grooves 52F$_1$ and 52R.

During a shifting operation within the lower or higher speed range set forth above, the change gears are still driven to rotate while the shaft 29 is rotated only by inertia. However, relative rotational speed between the shaft 29 and change gears belonging to one of the speed ranges does not become so large during a shifting operation because the inertial rotation speed of shaft 29 depends largely on the speed at which the shaft is driven to rotate before the shifting operation. Consequently, shock given to the clutch lugs 42a is relatively small.

The latching means shown in FIG. 10 may also be altered to the one shown in FIG. 14.

We claim:

1. A key-shift transmission comprising: a transmission shaft having at its outer surface elongated axial grooves; a plurality of axially spaced speed-change gears rotatably mounted on said transmission shaft; shift keys slidably disposed within said axial grooves for coupling said speed-change gears one at a time to said transmission shaft; a shifter sleeve slidably mounted on said transmission shaft; and means for connecting said shift keys and said shifter sleeve; said shifter sleeve having a plurality of axially spaced operative positions where said shift keys are located at respective gear-coupling positions thereof, characterized in:

that a shifter for (51) operative by a change lever (58) and engaging said shifter sleeve (43) for causing a sliding movement of the sleeve is slidably mounted on a rotatable fork shaft (50) which extends parallel with said transmission shaft, said fork shaft having at its outer surface a plurality of axially spaced annular grooves (52N, 52F$_1$, 52F$_2$, 52F$_3$, 52F$_4$, 52F$_5$, 52F$_6$, 52R) into which a spring-biased latching ball (55) received in said shifter fork is projected so as to latch said shifter sleeve on said transmission shaft, respectively, at each of a neutral position and said operative positions;

that a second ball (61) is provided which is received in said shifter fork in a fashion such that a part of said second ball enters one of said annular groves and engages side walls of said annular groove so as to prevent a sliding movement of said shifter fork at each of said neutral and operative positions of said shifter sleeve, said fork shaft being formed at its annular wall portions between the two adjacent annular grooves with a plurality of axially aligned first cut-out grooves (65) which permit said second ball to pass therethrough in the axial direction of said fork shaft thereby to permit a sliding movement of said shifter fork; and that said fork shaft (50) is operatively connected to a control means (26) for a clutch (22), operative to interrupt input of power to the transmission, such that when said clutch is disengaged said fork shaft is rotated to an angular position where said cut-out grooves (65) are aligned with said second ball (61) in the axial direction of said fork shaft.

2. A key-shift, transmission as claimed in claim 1, wherein at least one of said annular wall portions of said fork shaft (50) is formed with a second cut-out groove (74) which is aligned axially with said second ball (61) at the engaged condition of said clutch (22) so as to permit said second ball to pass therethrough in the axial direction of said fork shaft.

3. A key-shift transmission as claimed in claim 2, wherein plural forward direction change gears (37F$_2$, 37F$_3$, 37F$_4$, 37F$_5$, 37F$_6$) of said change gears are mounted on said transmission shaft (29) so that change gears for lower to higher transmission ratios are disposed successively along one direction of said transmission shaft, said plural forward direction gears being grouped into lower transmission ratio gears and higher transmission ratio gears and said fork shaft (50) including a plurality of said second cutout grooves (74) which permit said second ball (61) to pass therethrough when said shifter sleeve (43) is displaced between the operative positions for coupling said lower transmission ratio gears and between the operative positions for coupling said higher transmission ratio gears.

4. A key-shift transmission as claimed in claim 2, wherein said second cut-out groove (74) is formed to said one annular wall portion in unison with said first cut-out groove (65) of said one annular wall portion.

5. A shifting assembly for a key-shift transmission having a transmission shaft with elongate axial grooves in its outer surface, a plurality of axially spaced speed-change gears rotatably mounted on said transmission shaft, shift keys slidably disposed within said axial grooves for coupling said speed-change gears one at a time to said transmission shaft, a shifter sleeve slidably mounted on said transmission shaft, and means for connecting said shift keys and said shifter sleeve, said shifter sleeve having a plurality of axially spaced operative positions where said shift keys are located at respective gear-coupling positions thereof, said assembly comprising:

a rotatable fork shaft which extends parallel to said transmission shaft, said fork shaft having at its outer surface a plurality of axially spaced annular grooves;

a shifter fork slidable mounted on said rotatable fork for engaging said shifter sleeve and moving said shifter sleeve;

said shifter fork including a spring-biased first latching means for projecting into the axially spaced annular grooves of said fork shaft to latch said shifter sleeve at a neutral position or at said operative positions;

said shifter fork including second latching means for projecting into the axially spaced annular grooves of said fork shaft to prevent a sliding movement of said shifter fork at each of said neutral and operative positions of said shifter sleeve;

said fork shaft having a plurality of axially-aligned first cut-out grooves formed into annular wall portions between two adjacent annular grooves, said cut-out grooves permitting said second latching means to pass therethrough in the axial direction of said fork shaft and said shifter fork to slide along said fork shaft; and control means for rotating said fork shaft to a first angular position where said cut-out grooves are aligned with said second latching means and to a second angular position where said cut-out grooves are out of alignment with said latching means.

* * * * *

UNITED STATES PATENT AND TRADEMARK OFFICE
CERTIFICATE OF CORRECTION

PATENT NO. : 4,827,783

DATED : May 9, 1989

INVENTOR(S) : Kojiro Yamaoka et al

It is certified that error appears in the above-identified patent and that said Letters Patent is hereby corrected as shown below:

Col. 9, line 49 change "for" to --fork--.

Signed and Sealed this

Tenth Day of October, 1989

Attest:

DONALD J. QUIGG

*Attesting Officer*  *Commissioner of Patents and Trademarks*